US007237269B2

(12) United States Patent
Johnson et al.

(10) Patent No.: US 7,237,269 B2
(45) Date of Patent: Jun. 26, 2007

(54) METHOD AND SYSTEM FOR SECURE ACTIVATION OF WEB CLIPPING APPLICATIONS

(75) Inventors: Scott Johnson, Sunnyvale, CA (US); Suena Johnson, Sunnyvale, CA (US)

(73) Assignee: Palmsource, Inc., Sunnyvale, CA (US)

( * ) Notice: Subject to any disclaimer, the term of this patent is extended or adjusted under 35 U.S.C. 154(b) by 842 days.

(21) Appl. No.: 09/727,908

(22) Filed: Nov. 30, 2000

(65) Prior Publication Data

US 2002/0066027 A1    May 30, 2002

(51) Int. Cl.
*G06F 7/04*     (2006.01)
*G06F 17/30*    (2006.01)
*G06K 9/00*     (2006.01)
G06F 9/00      (2006.01)
G06F 15/16     (2006.01)

(52) U.S. Cl. .............................. 726/29; 726/29; 726/12; 717/174; 717/176; 709/228; 709/231; 709/219; 705/26; 455/422

(58) Field of Classification Search ................ 713/200; 709/219, 228, 231; 705/26; 455/422; 726/29, 726/12; 717/174, 176
See application file for complete search history.

(56) References Cited

U.S. PATENT DOCUMENTS

| 5,768,528 | A | * | 6/1998 | Stumm ........................ 709/231 |
| 5,809,415 | A | * | 9/1998 | Rossmann ................ 455/422.1 |
| 5,956,505 | A | * | 9/1999 | Manduley ........................ 713/1 |
| 5,956,636 | A | * | 9/1999 | Lipsit .......................... 455/411 |
| 6,076,109 | A | * | 6/2000 | Kikinis ........................ 709/228 |
| 6,611,812 | B2 | * | 8/2003 | Hurtado et al. ................ 705/26 |
| 6,947,995 | B2 | * | 9/2005 | Chang et al. ................ 709/231 |
| 2001/0046862 | A1 | * | 11/2001 | Coppinger et al. ......... 455/435 |
| 2002/0062361 | A1 | * | 5/2002 | Kivipuro et al. ............ 709/219 |
| 2002/0131404 | A1 | * | 9/2002 | Mehta et al. ................ 370/352 |

* cited by examiner

*Primary Examiner*—Christopher Revak
*Assistant Examiner*—Arezoo Sherkat
(74) *Attorney, Agent, or Firm*—Berry & Associates P.C.

(57) ABSTRACT

The invention disclosed is a method and system for the secure activation of web clipping applications upon a portable information device (PID). In an embodiment of the invention, the method first provides for preventing a user from accessing web clipping applications that are installed on the PID and located within installed software. The method then continues with a user registering the PID with a proxy server by using a registration application within the installed software. Upon the authorized registration of the PID with the proxy server, the web clipping applications are revealed to the user, and with the web clipping applications thus revealed, the user may retrieve information from the proxy server through the implementation of any of the web clipping applications. The invention further provides for a method and system for the secure access of a proxy server by a PID such that the recurring step of device identification can be eliminated. This provides for reduced overhead in recurring data transmissions and affords more efficient communications.

20 Claims, 4 Drawing Sheets

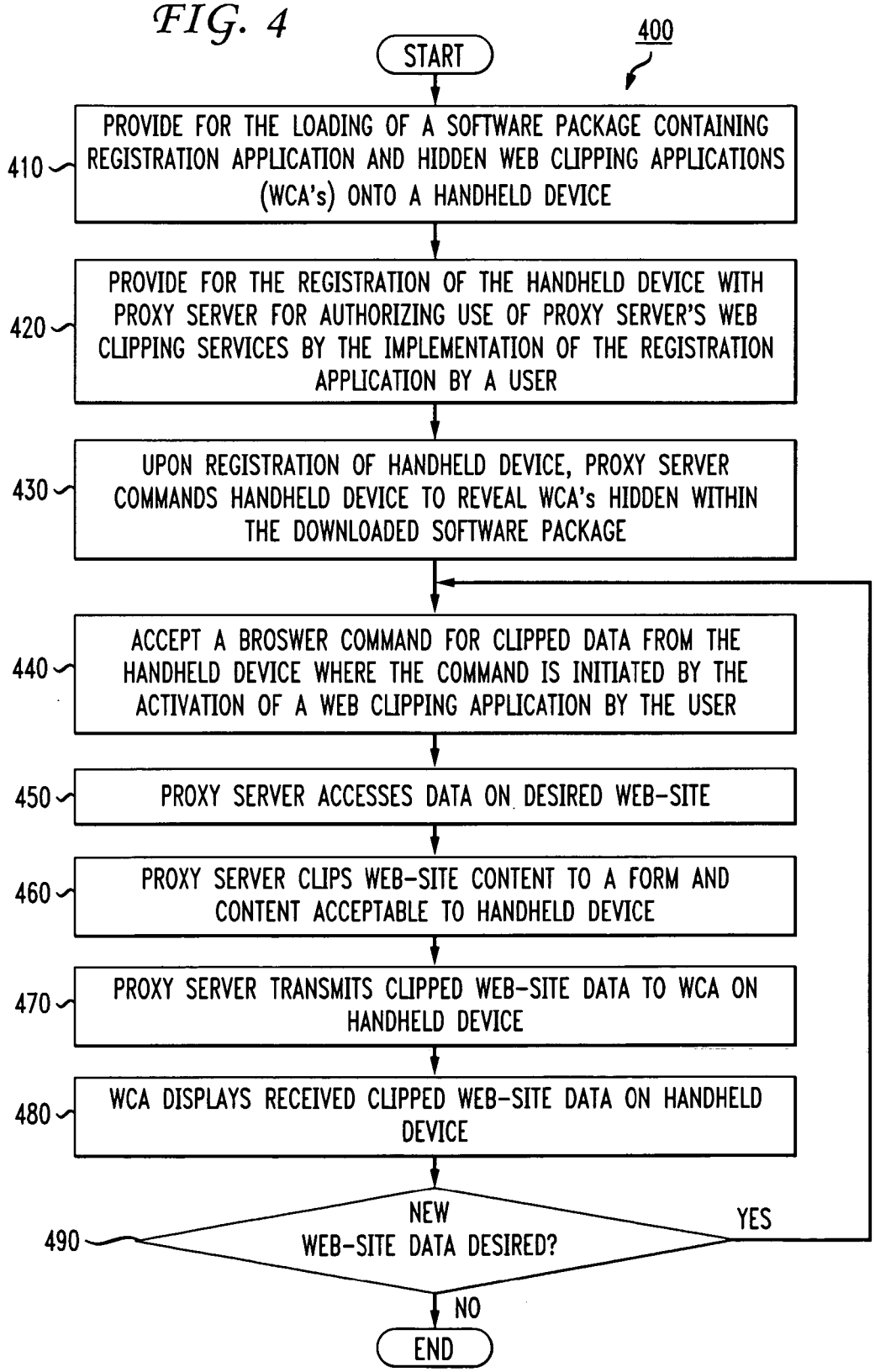

METHOD AND SYSTEM FOR SECURE ACTIVATION OF WEB CLIPPING APPLICATIONS

FIELD OF THE INVENTION

The present invention relates to wireless communications and software activation. More particularly, the present invention pertains to a method and system for the secure activation of web clipping applications upon handheld organizers and other portable information devices (PID's).

BACKGROUND OF THE INVENTION

The use and presence of handheld organizers and other such compact and lightweight portable information devices (PID's), including laptop computers, cellular phones, and pagers, has burgeoned in recent years. The availability of these items to the average consumer has placed many into use and into all aspects of one's business and daily life. The presence of these devices has become common in the home and office, on the streets, in shops and restaurants, and in places of travel.

With the growth in usage of such PID's has come the desire to provide these devices with access to the Internet. Handheld organizers can be connected to personal computers (PC's) that have Internet access and information can be downloaded from the Internet and into the handheld device, and because of the portability of these handheld devices, the wireless access to the Internet is often desired.

Recently, handheld devices have been implemented with radio frequency (RF) communications ability. Wireless transceivers with short to medium range communications ability are being incorporated into the handheld devices. In conjunction with the incorporation of transceivers within these PID's, various wireless communications protocols, such as the Bluetooth, WAP (Wireless Application Protocol) and I.E.E.E. (Institute of Electrical and Electronics Engineers) 802.11 protocols, have been developed to provide standardized methods for establishing low-to-medium power, short-to-intermediate range radio frequency (RF) communications between RF enabled devices.

With the establishment of a capability for handheld organizers to communicate with the Internet using modems or wireless connections, a technological need to efficiently manage the data flow between the handheld device and the Internet has arisen. Because the Internet and Internet web-sites have been structured for data communications and delivery to desktop systems and servers, the volume of data and the delivery of the data may often be overwhelming to the handheld device and the associated data delivery system. The data display and data storage components within handheld devices are relatively small and limited when compared with those within desktop systems. Additionally, the ability to transfer data wirelessly is presently significantly more bandwidth limited than with the hardline communications of the Internet.

To address the needs of handheld devices in accessing the Internet, web clipping processes have been developed. Upon request of a handheld device, an Internet server acts as a proxy for the handheld device and gathers web-site data. In so doing, applications upon the proxy server clip the web-site content down to the core information upon the site, such as the news headlines and text within a news web-page. The core information is then transferred to the handheld device. Web clipping applications resident upon the handheld device effect the essential framework of the clipped web-site and incorporate the core information clipped from the web-site. The result is a condensed version of the web-site that is displayable upon the relatively small screen of the handheld device.

In wireless communications, data transfer can be relatively expensive and time consuming, therefore it is desirable to minimize the overhead in data transfer. Graphics and logos not essential to relaying the informative content of a web-site are removed during the web-site clipping process. It is also of benefit to remove other data commonly transferred in the communications between computing devices when it is not of an informative nature to the user.

One such non-informative data entity is the device and/or user identification information that is commonly transferred from a client device to a server device. This information is commonly transferred at every instance of a client device acquiring access to a server device for information. This data transfer burden becomes substantial, especially in a cumulative sense, when data bit transfer costs are high as they often are in wireless communications systems. Eliminating this identification information transfer would significantly improve the overall communications efficiency with regard to informative content in such wireless communications.

There remain, however, strong needs for retaining secure access to the services of the proxy server, whether accessed by communications line or wirelessly. Capacity planning requires the ability to track the number of users that are utilizing the proxy server services. Services that are often provided free of charge during the early stages of the establishment of a service market are often later subject to subscription charges and an ability to restrict access to authorized users becomes necessary.

Therefore, there is a need for a method and system for the secure activation of web clipping applications upon handheld organizers and other portable information devices (PID's) that reduce or eliminate the data transmission overhead associated with device log-in activities.

SUMMARY OF THE INVENTION

Accordingly, embodiments of the invention disclosed are directed at a method and system for the secure activation of web clipping applications upon a portable information device (PID). Embodiments further provide for a method and system for the secure access of a proxy server by a PID such that the recurring step of device identification (upon each communication) can be eliminated, thus allowing for reduced overhead in recurring data transmissions and affording more efficient communications.

In an embodiment of the invention, the method for the secure activation of web clipping applications upon a PID begins with the loading of a software package onto a PID where the software package comprises a registration application and multiple hidden web clipping applications (WCA's). The method then follows with the registering of the PID upon a proxy server by the implementation of the registration application. Upon the registration of the PID, the PID accepts a command from the proxy server to reveal the previously hidden web clipping applications. Without the authorized registration of the PID, the web clipping applications are not activated and remain hidden, and the PID is unable to access the proxy server.

In a further embodiment the method is performed such that the acquisition and loading of the software package onto the PID is performed by the PID by the downloading of the software package from the proxy server via the Internet and is performed without cost and without restriction to the user of the PID.

In an embodiment of the invention as a method for secure wireless access of a proxy server by a PID, the need for recurring device identification is eliminated. In the embodiment, the access of data and services from the proxy server may be performed without cost to the user and without registration or identification of the device or user during the access of the proxy server. In this embodiment, the PID need only be identified once, that is during the registration process. Following the registration of the PID and revealing of the WCA's, no further device identification or registration is necessary yet the usage of the WCA's remains secure with the registered PID.

The method is well suited for preventing the unauthorized access to the proxy server from modem based or wireless clients while improving the efficiency of the communications, especially for wireless users.

BRIEF DESCRIPTION OF THE DRAWINGS

The operation of this invention can be visualized by reference to the following drawings described below.

FIG. 4 is a flow diagram depicting a method for secure wireless access of a proxy server by a portable information device (PID) wherein recurring device identification is eliminated, in accordance with an embodiment of the invention.

DETAILED DESCRIPTION OF THE PREFERRED EMBODIMENTS

Described in detail below is a method and apparatus for the secure activation of web clipping applications upon handheld organizers and other portable information devices (PID's). In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The embodiments of the invention address the needs of handheld devices in accessing the Internet and particularly in the usage of web clipping processes in a method and system where the overhead in data transfer is reduced. The embodiments provide for a system where a client handheld device may be authorized for access and use of the web clipping services of a proxy server upon a single registration event. The embodiments of the invention allow for a continued secure access of a handheld device to a proxy server but without the continued transfer of device and/or user identification information between the client device and the server device, and thus significantly improves the overall communications efficiency with regard to informative content in such wireless communications. The inventive system retains secure access to the services of the proxy server so that capacity planning and subscription charging may be effected.

Figure 1:
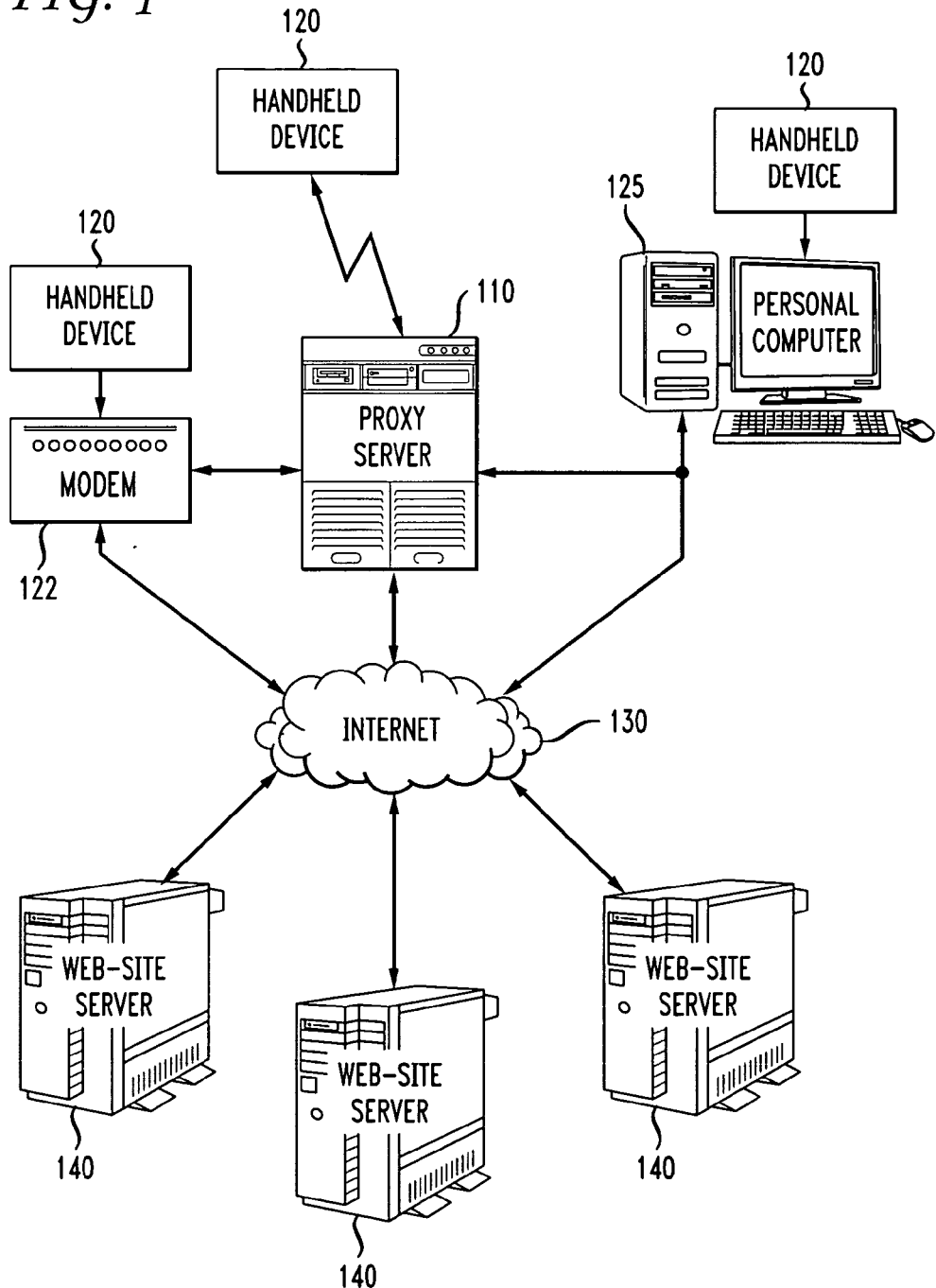
FIG. 1 illustrates a block diagram of the system for secure wireless access of a proxy server by a portable information device (PID) wherein recurring device identification is eliminated, in accordance with an embodiment of the invention.

FIG. 1 illustrates a block diagram of the system for secure wireless access of a proxy server by a portable information device (PID) wherein recurring device identification is eliminated, in accordance with an embodiment of the invention.

In FIG. 1 an embodiment is shown where handheld devices 120 communicate with a proxy server 110 in various ways. Exemplary communications modes shown are by access via modem 122 to the Internet 130, by access via modem 122 to the proxy server 110 directly, through a connection to a personal computer 125 where the computer accesses the proxy server 110 directly or through the Internet 130, or directly via RF communications. The RF communications mode of communication between the handheld device and the proxy server may employ the Mobitex radio communications network.

Proxy server 110 may access any number of multiple web-sites 140 via the Internet 130. In the embodiment any handheld device 120 loads a software package containing a registration application and multiple hidden web clipping applications. The handheld device registers its identity with the proxy server 110 by implementing the registration application. Proxy server 110, upon successfully registering handheld device 120, commands the handheld device to reveal the web clipping applications hidden within the loaded software package. With the web clipping applications revealed and available to a user of handheld device 120, requests for web-site data may be made upon the handheld device 120 by activating any of the web clipping applications. The activation of a WCA causes a browser on the handheld device 120 to request web-site data from the proxy server 110. Proxy server 110 then accesses data on a web-site 140 corresponding to the particular WCA activated. Proxy server 110 clips the data from web-site 140 down to a form and content manageable by the handheld device 120. Proxy server 110 transmits the clipped data to handheld device 120 via RF communications. Upon receipt of the clipped data, the WCA upon handheld device 120 incorporates the clipped data into a web-page framework stored within the WCA and displays the result for the user.

Figure 2:
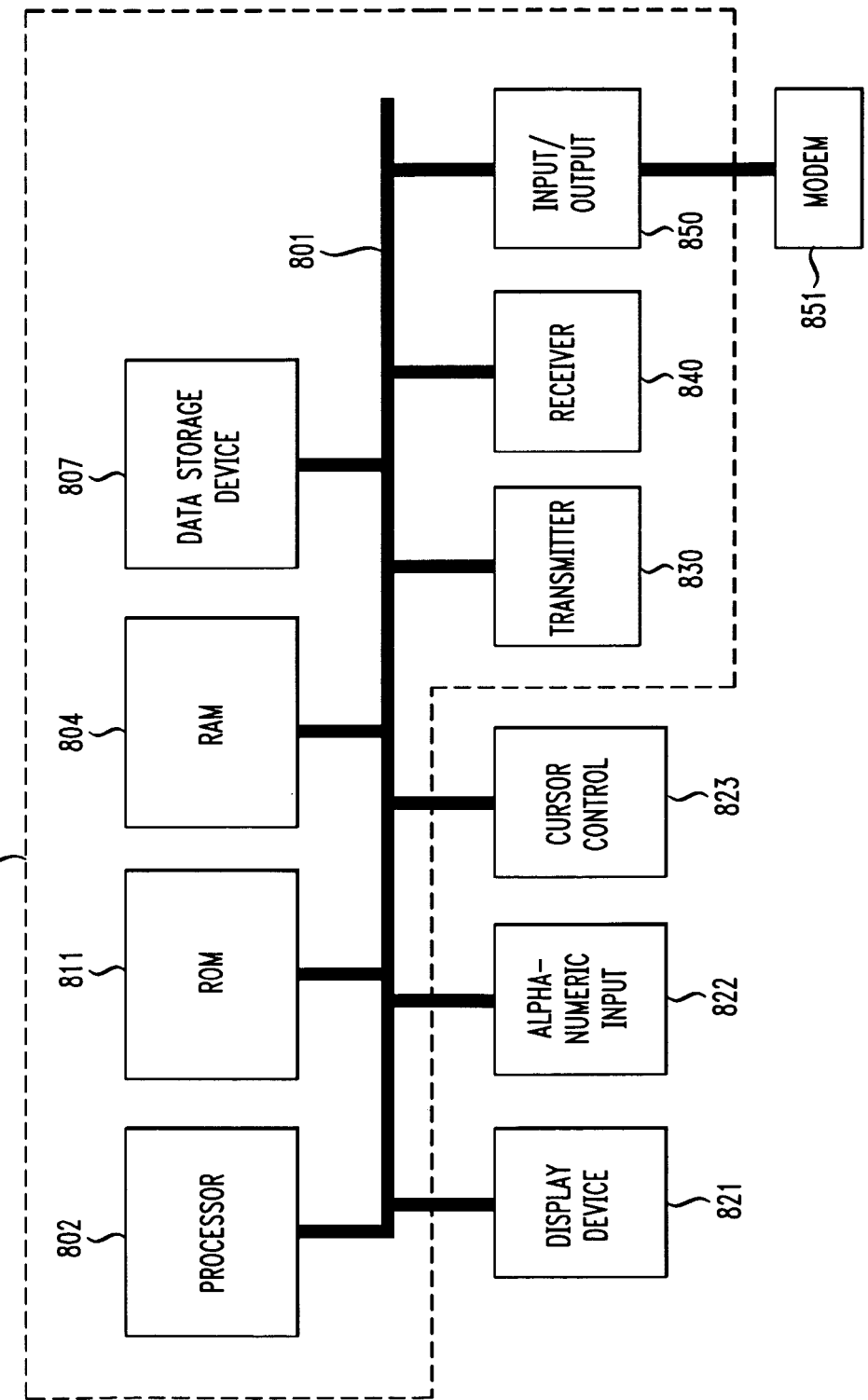
FIG. 2 is a block diagram depicting an exemplary portable information device upon which the invention may be practiced in accordance with an embodiment of the invention.

FIG. 2 illustrates an exemplary configuration of a portable information device (PID) 800 upon which the present invention may be implemented or practiced. It is appreciated that the PID 800 of FIG. 2 is exemplary only and that the present invention can operate upon a number of different information devices and computer systems, portable and stationary. PID 800 of FIG. 2 includes an address/data bus 801 for conveying digital information between the various components, a central processor unit (CPU) 802 for processing the digital information and instructions, a main memory 804 comprised of random access memory (RAM) for storing the digital information and instructions, a read only memory (ROM) 811 for storing information and instructions of a more permanent nature.

In addition, PID 800 may include a data storage device 807 (e.g., a magnetic, optical, floppy, or tape drive) and a data communications input/output port 850. A transmitter 830 and a receiver 840 are additionally included within the PID 800 shown. It should be noted that the client program for performing the functions of the invention can be stored either in main memory 804, data storage device 807, or in an external storage device. Devices which may be coupled to PID 800 include a display device 821 for displaying information to a PID user, an alphanumeric input device 822 (e.g., a keyboard), and a cursor control device 823 (e.g., mouse, trackball, light pen, etc.) for inputting data and selections. A modem 851 may also be coupled to the PID 800 for providing hardline communications to the Internet or directly to a proxy server.

In another embodiment, the invention is an apparatus providing for the secure activation of web clipping applications and secure wireless access of a proxy server where recurring device identification is eliminated. The apparatus first comprises a means for loading a software package onto the apparatus where the software package includes a registration application and multiple hidden web clipping applications. The apparatus also comprises a means for registering the apparatus by the implementation of the registration application. Additionally, the apparatus comprises a means for accepting a command to reveal the web clipping applications upon the successful registration of the apparatus.

In another embodiment of the invention, a computer-usable medium, such as ROM 811, RAM 811, and/or data storage device 807 of FIG. 2, has stored thereon computer-readable code for causing a computer, such as processor 802 of FIG. 2, or portable information device, e.g. PID 800 described in FIG. 2, to provide secure activation of web clipping applications upon a portable information device. The code also enables the device to interact with a proxy server such that the secure access of the proxy server by the PID is achieved and where recurring device identification is eliminated.

In an embodiment of the invention the components of PID 800 of FIG. 2 are resident within a device, such as a handheld organizer, for which secure activation of web clipping applications is desired, and the computer-readable code described above is downloaded to a computer-usable medium within the device so to allow it to respond as such a device.

In another embodiment of the invention, a device such as PID 800 has the computer-readable code described above stored on a computer-usable medium within the device a priori, and then this device is attached to a second device, such as a cellular phone, for which secure activation of web clipping applications is desired.

The embodiments of the invention as a method for the secure activation of web clipping applications upon a portable information device are described below. Additionally described are the embodiments of the invention as a method for the secure access of a proxy server by a PID such that the recurring step of device identification can be eliminated. The resulting method thus allows for reduced overhead in recurring data transmissions and affords more efficient wireless and hardline communications.

Figure 3:
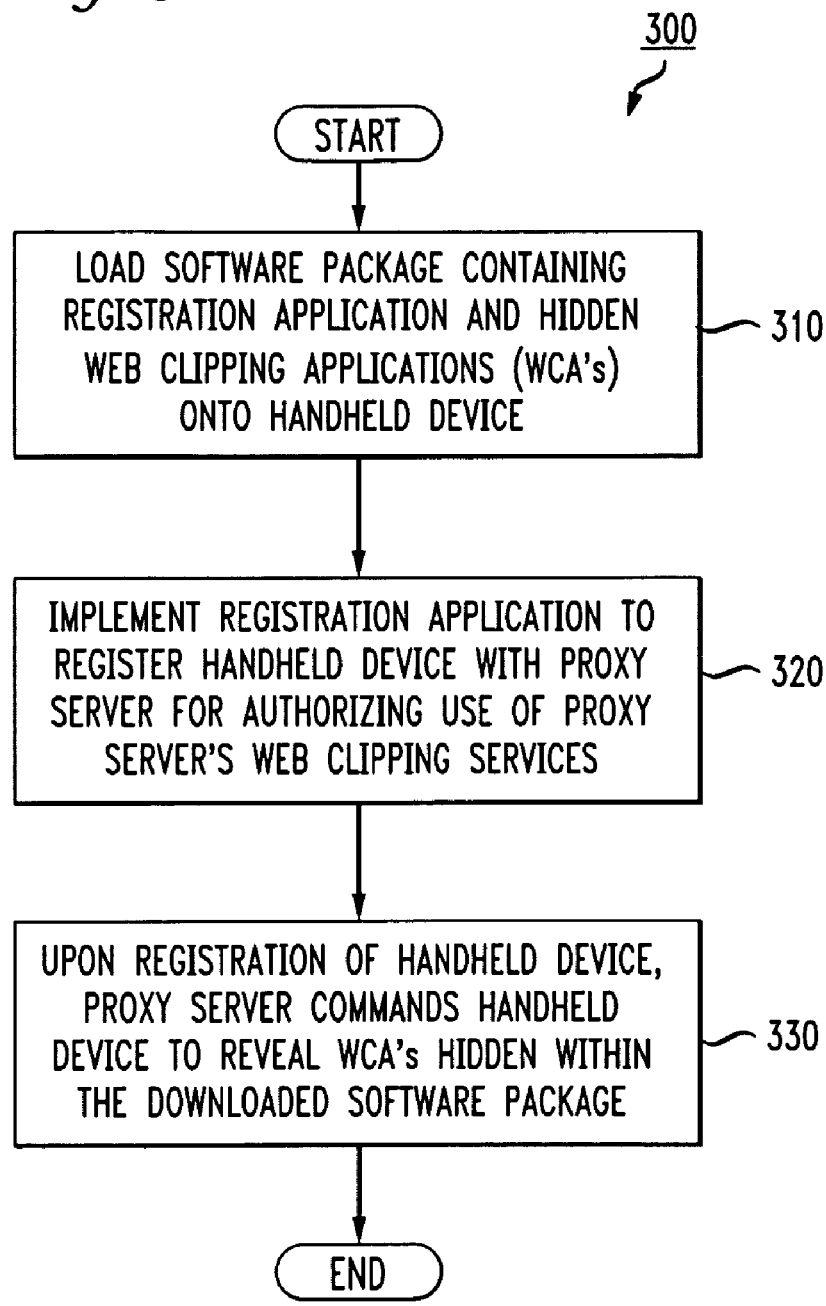
FIG. 3 is a flow diagram depicting a method for the secure activation of web clipping applications upon a portable information device in accordance with an embodiment of the invention.

FIG. 3 is a flow diagram depicting a method 300 for the secure activation of web clipping applications upon a portable information device in accordance with an embodiment of the invention. Method 300 begins with step 310 where a software package containing a registration application and multiple hidden web clipping applications is loaded onto a handheld device. The device may be one of any type of appropriately enabled portable information devices including handheld organizers, cell phones, and laptop computers. The software package may be such that the web clipping applications are hidden within the registration application. However constructed, the software package is such that the web clipping applications are not apparent or accessible by the user at this step in the method. This prevents the user from gaining unauthorized access of the proxy server and its services from the handheld device.

The loading of the software package onto the handheld device in step 310 may be performed by various means. In example, the handheld device may be connected to a personal computer and the software downloaded from permanent storage media, such as a floppy disk or CD (compact disk). Alternatively, the software may be downloaded to the personal computer via a modem connection to the Internet and thereafter loaded onto the handheld device. Or for example, the software may be loaded onto the handheld device via a peripheral device attached directly to the handheld device.

For any method for loading the software package onto the handheld device, the method 300 provides that step 310 need not require a controlled access to the software or software media for maintaining secure activation of the web clipping applications upon the handheld device, nor for maintaining secure access of a proxy server by the handheld device where recurring device identification is eliminated.

The method 300 of FIG. 3 follows with step 320 where the handheld device is registered with a proxy server so to authorize the device to access and use the web clipping services of the proxy server. This registration process is performed through the implementation of the registration application loaded onto the handheld device in step 310. This registration process may be performed by the handheld device communicating directly to the proxy server wirelessly or via the Internet.

The method 300 of FIG. 3 concludes with step 330 where upon the registration of the handheld device with the proxy server, the proxy server commands the handheld device to reveal the hidden web clipping applications loaded onto the device in step 310. This step may be performed by the proxy server issuing commands to the handheld device in the context of the registration application. Upon the successful registration of the handheld device, the proxy server issues commands to the registration application to reveal the web clipping applications present on the handheld device, but hidden and previously inaccessible by the user of the handheld device. This step may include the unpacking and loading of the web clipping applications into memory and/or permanent storage on the handheld device from a compressed and/or encrypted form.

Another exemplary manner for the proxy server to effect the step 330 and command the handheld device to reveal the web clipping applications could be where the proxy server issues activation codes to the WCA's hidden on the handheld device. Once the activation codes are obtained, the WCA's complete an implementation routine on the handheld device and make their presence and accessibility known to the user, such as by the display of icons on the display screen of the handheld device.

It is appreciated that prior to the device registration step 330 and without completion of step 330, the user is unable to gain access to the proxy server and its services by using the handheld device. The web clipping applications are necessary for activating the browser on the PID which is necessary for gaining access to the proxy server. Until the WCA's are revealed, the user of the handheld device has no means for issuing commands to the proxy server and therefore access to the proxy server is unavailable.

Once the WCA's are revealed and made accessible to the user, no further device identification or registration steps are necessary for the device to have repeated access to the proxy server for gaining the services and clipped web-site data from the proxy server. This aspect of the invention is discussed further below in reference to FIG. 4.

FIG. 4 is a flow diagram depicting a method 400 for secure access of a proxy server by a portable information device wherein recurring device identification is eliminated, in accordance with an embodiment of the invention. The method 400 begins with steps 410, 420, and 430 which are comparable to steps 310, 320, and 330 of method 300 of FIG. 3. In method 400, step 410 provides for the loading of a software package containing a registration application and multiple hidden web clipping applications onto a handheld device. Step 420 follows and provides for the registration of the handheld device with the proxy server for authorizing use of the proxy server's web clipping services. This registration process is effected by the implementation of the registration application loaded onto the handheld device in step 410. Step 430 then follows and is comprised of the proxy server, upon the successful registration of the handheld device, commanding the handheld device to reveal the hidden web clipping applications loaded onto the handheld device in step 410.

The method 400 then continues thereafter and provides for the secure access of the proxy server by the handheld device wherein recurring device identification is eliminated. In step 440 the proxy server accepts a browser command for web-site data from the handheld device. The browser command is initiated by the activation of one of the web clipping applications. In one variation of the method, the browser is unavailable for direct application by the user of the handheld device and can be implemented only through the activation of any of the web clipping applications.

In step 450, the proxy server accesses the web-site data per the browser command. In one embodiment, each web clipping application corresponds to a particular web-site and the activation of a particular web clipping application results in the access of data from a particular web-site by the proxy server.

Next in step 460 of FIG. 4, the proxy server clips the web-site data to a form and content acceptable by the handheld device. In the clipping process, the basic information content and significant text are gleaned from the web-site. Logos and graphics may and are often left behind. The data retained is of a form and content that can be displayed within the web-page framework of the particular web clipping application activated on the handheld device.

Following in step 470, the proxy server transmits the clipped web-site data to the handheld device. The web clipping application may then receive the clipped data and incorporate it into the web-page framework of the web clipping application. The secure access of the proxy server by the handheld device is thus complete at the completion of step 470. Further steps provide for the display of the received data and the further access of the proxy server where the recurring device identification is eliminated.

In step 480, the web clipping application displays the received clipped data upon the handheld device. The web clipping application may provide various web-page frameworks for the display of the clipped data, depending on the type of clipped data received.

Step 490 provides for a reaccess of the proxy server by returning to step 440 or to an end to the method. In a return to step 440, a new browser command is issued to the proxy server through the activation of a web clipping application upon the handheld device. In so doing, no device identification is needed and thus this common necessity for maintaining secure access to a proxy server is eliminated.

Hence, a method and system for the secured activation of web clipping applications upon handheld organizers and other portable information devices is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the claims appended hereto and their equivalents.

What is claimed is:

1. In a portable information device (PID) having previously installed software therein for accessing a proxy server, a method comprising the steps of:
   a) preventing a user from accessing web clipping applications that are previously installed on said PID and located within said installed software;
   b) said user registering said (PID) with said proxy server using a registration application of said installed software; and
   c) upon authorized registration of said (PID) with said proxy server, allowing said web clipping applications to be made available for use by said user and otherwise preventing access of said web clipping applications by said user.

2. The method of claim 1 wherein said (PID) comprises handheld organizers, cellular phones, laptop computers, and pagers.

3. The method of claim 1 wherein said step a) of preventing a user from accessing web clipping applications is comprised of:
   preventing a user from accessing web clipping applications that are installed on said (PID) and located within said installed software by hiding said web clipping applications within said installed software until such time that said device is registered with said proxy server.

4. The method of claim 3 wherein said step c) of allowing said web clipping applications to be made available is comprised of:
   upon authorized registration of said (PID) with said proxy server, revealing said web clipping applications to said user and otherwise preventing access of said web clipping applications by said user.

5. The method of claim 1 further comprising the step of:
   d) said user implementing at least one of said web clipping applications to access and retrieve information from a web-site via said proxy server.

6. The method of claim 5 wherein said step d) of said user implementing at least one of said web clipping applications to access and retrieve information is comprised of steps:
   d1) said user implementing at least one of said web clipping applications;
   d2) said at least one web clipping application commanding a browser application within said installed software to seek web-site data associated with said at least one web clipping application;
   d3) said browser accessing said proxy server and requesting clipped data from said web-site associated with said at least one web clipping application; and d4) said (PID) receiving said clipped data requested by said browser from said proxy server.

7. The method of claim 5 wherein said step d) of said user implementing at least one of said web clipping applications to access and retrieve information is performed without registration of said (PID) during said accessing and without a transfer of user authorization information.

8. The method of claim 1 wherein said installed software upon said (PID) is a result of a step preceding said step a) of preventing a user from accessing web clipping applications, said step preceding comprising:
   downloading said software from said proxy server onto said (PID).

9. A method for secure access of a proxy server by a portable information device (PID) wherein recurring device identification is eliminated, comprising the steps of:
   a) loading a software package onto said PID wherein said software package comprises a registration application and multiple hidden web clipping applications;
   b) registering said PID by the implementation of said registration application by a user;
   c) upon said registering said PID, commanding by said proxy server to said PID to reveal said web clipping applications;
   d) initiating a browser command for clipped data from said PID, wherein said initiating is a result of an activation by said user of at least one of said revealed web clipping applications; and
   e) transmitting said clipped data to said PID.

10. The method of claim 9 further comprising the steps of:
    d1) accessing data on a web-site corresponding to said at least one of said revealed web clipping applications; and
    d2) clipping content on said web-site to create clipped data acceptable to said PID.

11. The method of claim 9 wherein said step a) of loading a software package onto said PID is comprised of the step of:
    downloading a software package from said proxy server via the Internet onto said PID.

12. The method of claim 9 wherein said step of loading a software package onto said PID is without cost to said user and without restriction to acquirement of said software package by said user.

13. The method of claim 9 wherein said web clipping applications allow a user of said PID to access data and services on a proxy server without cost to said user and without registration of said user during said accessing of data and services.

14. The method of claim 9 wherein said web clipping applications are hidden inside said registration application.

15. A system comprising:
    a proxy server coupled to the Internet; and
    an electronic device comprising a processor coupled to a bus and a memory coupled to said bus, said memory having previously installed software for accessing said proxy server and having stored therein instructions for implementing a method comprising the steps of:
    a) preventing a user from accessing previously installed web clipping applications that are installed on said electronic device and located within said installed software;
    b) said user registering said electronic device with said proxy server using a registration application of said installed software; and
    c) upon authorized registration of said electronic device with said proxy server, allowing said web clipping applications to be made available for use by said user and otherwise preventing access of said web clipping applications by said user.

16. The system of claim 15 wherein said electronic device is a personal information device (PID) comprising at least one of a handheld organizer, a cellular phone, a laptop computer, or a pager.

17. The system of claim 15 wherein said step a) of preventing a user from accessing web clipping applications implemented by said electronic device is comprised of:
    preventing a user from accessing web clipping, applications that are installed on said electronic device and located within said installed software by hiding said web clipping applications within said installed software until such time that said device is registered with said proxy server.

18. The system of claim 15 wherein said step c) of allowing said web clipping applications to be made available for use by said user is comprised of:
    upon authorized registration of said electronic device with said proxy server, revealing said web clipping applications to said user and otherwise preventing access of said web clipping applications by said user.

19. The system of claim 15 wherein said method implemented by said electronic device further comprises the step of:
    d) said user implementing at least one of said web clipping applications to access and retrieve information from a web-site via said proxy server.

20. The system of claim 15 wherein said installed software upon said electronic device is a result of a step preceding step a) of preventing a user from accessing web clipping applications, comprising the step of:
    downloading said software from said proxy server onto said electronic device.

* * * * *